Figure 1:
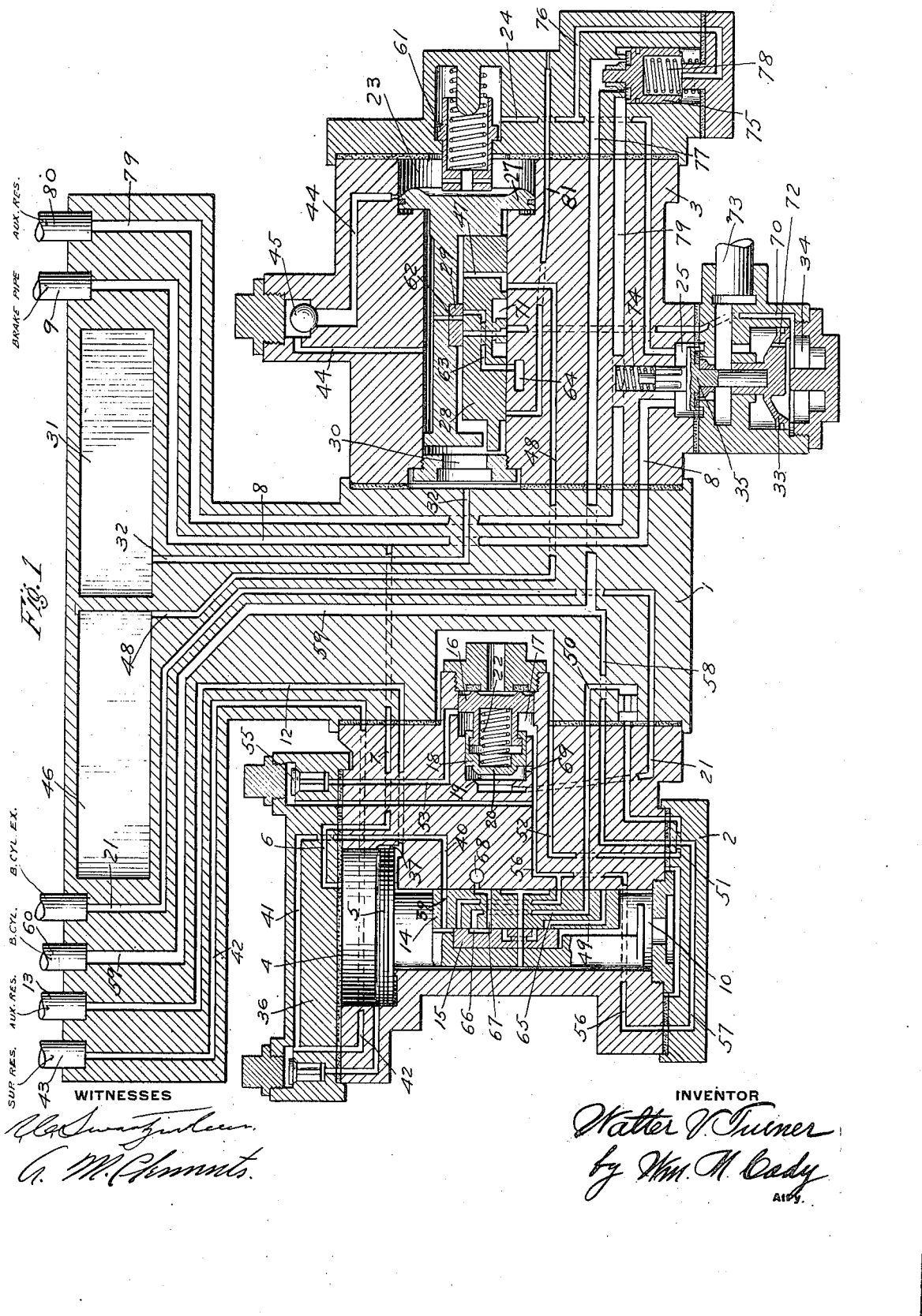

W. V. TURNER.
FLUID PRESSURE BRAKE APPARATUS.
APPLICATION FILED AUG. 7, 1914.

1,241,581.

Patented Oct. 2, 1917.
3 SHEETS—SHEET 2.

Fig. 2

INVENTOR
Walter V. Turner
by Wm. M. Cady
Att'y.

WITNESSES

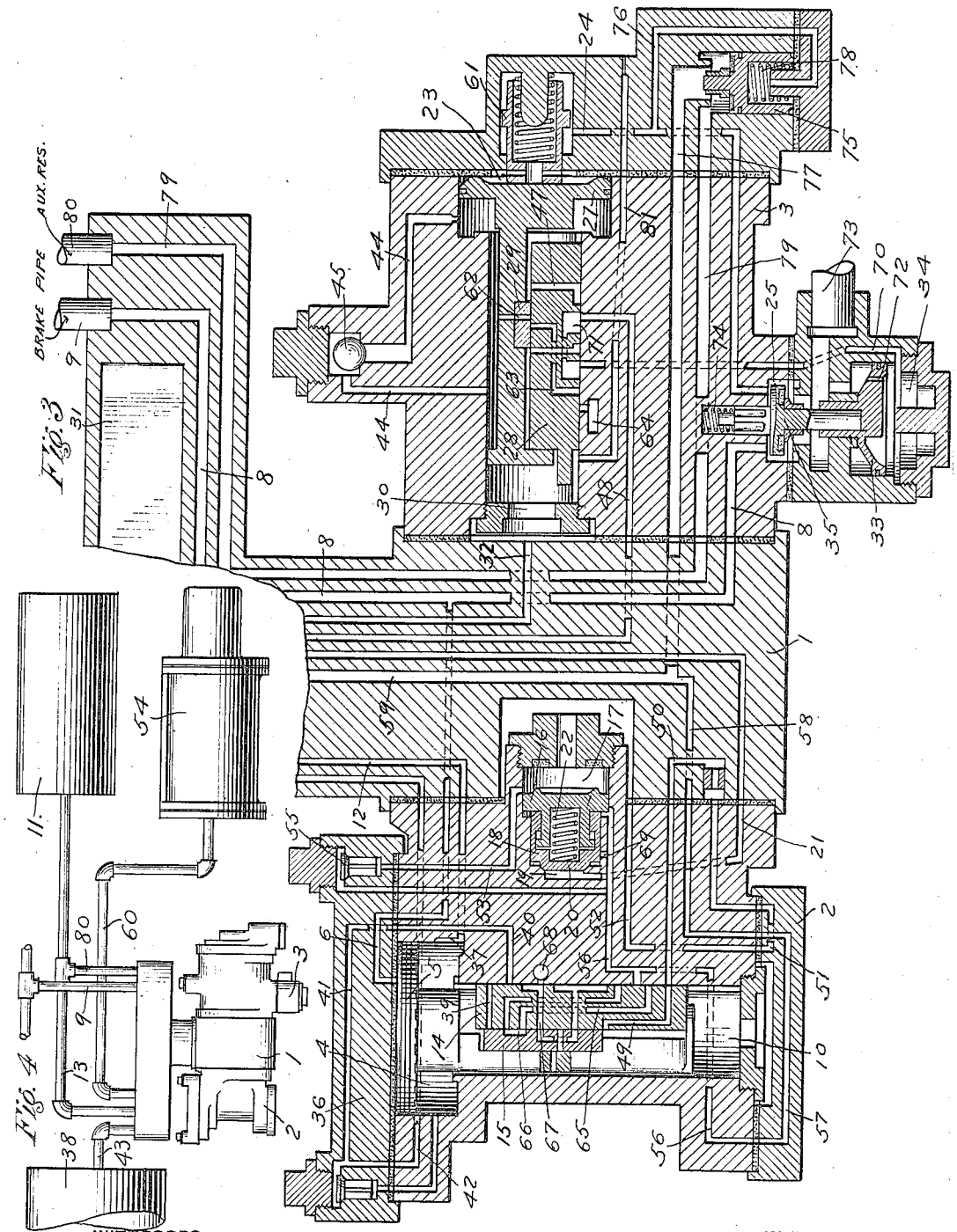

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE APPARATUS.

1,241,581.  Specification of Letters Patent.  Patented Oct. 2, 1917.

Application filed August 7, 1914. Serial No. 855,676.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brake Apparatus, of which the following is a specification.

This invention relates to fluid pressure brakes, and more particularly to apparatus for controlling the application and release of the brakes.

It has heretofore been proposed to employ a separate release valve mechanism for controlling the release of the brakes, which operates to close the brake cylinder exhaust upon flow of fluid to the brake cylinder in applying the brakes, and in releasing, fluid is vented from the valve mechanism to effect the opening of the brake cylinder exhaust.

In order to secure a prompt response in releasing, the volume to be vented should be as small as possible and for this purpose, one object of my invention consists in providing improved means for preventing back flow from the brake cylinder to the release valve mechanism.

It has also been proposed to employ an emergency valve mechanism subject to the opposing pressures of a reservoir and the brake pipe for effecting an emergency application of the brakes upon a sudden reduction in brake pipe pressure.

With a construction of the above type, the reservoir volume is charged from the brake pipe through a feed groove around the emergency valve piston, and during service applications, fluid can leak through the feed groove to the brake pipe and thus tend to delay or lengthen the time of obtaining a service reduction in brake pipe pressure. There is also present the possibility that the feed groove may become restricted, so as to prevent the reduction in reservoir pressure with the brake pipe pressure in service applications and this would be liable to cause an undesired movement of the emergency valve mechanism to emergency position.

In order to obviate the above difficulties, another object of my invention is to provide an emergency valve mechanism having means for preventing the return flow of fluid from the reservoir to the brake pipe upon effecting a reduction in brake pipe pressure and further to provide means for reducing the reservoir pressure substantially with brake pipe pressure upon effecting a gradual reduction in brake pipe pressure in making a service application of the brakes.

Back flow from the reservoir to the brake pipe is prevented, according to my invention, by eliminating the feed groove around the emergency piston and providing a feed passage from the brake pipe to the reservoir containing a check valve for preventing return flow.

Reduction of reservoir pressure in service applications with brake pipe pressure reductions is accomplished by providing a service position of the emergency valve mechanism, in which fluid is vented from the reservoir at a rate corresponding with the rate of reduction in brake pipe pressure.

Another object of my invention is to provide a valve mechanism for supplying fluid from the auxiliary reservoir to the brake cylinder in service applications and having means operating in an emergency application for supplying fluid through a large direct passage from the auxiliary reservoir to the brake cylinder.

In the accompanying drawings; Figure 1 is a diagrammatic view of a valve mechanism for controlling the application and release of the brakes embodying my invention and showing the parts in normal release position; Fig. 2 a similar view, showing the parts in service application position; Fig. 3 a similar view, showing the parts in emergency application position; and Fig. 4 a view of a car air brake equipment including the valve mechanism shown in Figs. 1, 2, and 3.

The construction may comprise a pipe bracket 1, an equalizing valve portion 2 and an emergency valve portion 3 adapted to be secured to the pipe bracket 1 to effect the registry of the various communicating passages.

The equalizing portion 2 has a piston chamber 4 containing piston 5 and connected by passages 6, 7, and 8 with brake pipe 9, and a valve chamber 10 connected to the auxiliary reservoir 11 through passage 12 and pipe 13 and containing main slide valve 14 and auxiliary slide valve 15 adapted to be operated by the piston 5.

A separate release valve mechanism is also embodied in the equalizing valve portion 2 and comprises a differential piston having a piston head 16 contained in piston chamber 17, and a collapsible piston head 18 of less area, contained in piston chamber 19 and provided with a valve 20 for controlling a brake cylinder exhaust port 21.

The piston heads 16 and 18 are provided with interlocking annular flanges adapted to permit a limited relative movement of the heads and a spring 22 is interposed between the piston heads.

The emergency valve portion 3 has a piston chamber 23 communicating through passage 24, quick action valve chamber 25, and passage 8 with brake pipe 9 and containing a piston 27. The piston 27 is adapted to operate a slide valve 28 and an auxiliary valve 29, contained in valve chamber 30, which is in open communication with quick action chamber 31 through a passage 32.

The emergency valve portion may also contain a quick action valve mechanism comprising a piston 33 contained in piston chamber 34 and a vent valve 35 contained in valve chamber 25 and adapted to be operated by the piston 33.

With the graduated release cap 36 adjusted to graduated release position, as shown in the drawings, the operation is as follows: in charging up the system, fluid flows through the brake pipe 9 and passages 8, 7, and 6 to the equalizing piston chamber 4 and passes through the feed groove 37 around piston 5 to valve chamber 10 and through passage 12 to the auxiliary reservoir 11. The supplemental reservoir 38 is charged from valve chamber 10 through port 39 in slide valve 14, passages 40, 41, and 42 and pipe 43.

Fluid from the brake pipe also flows through passage 8, quick action valve chamber 25 and passage 24 to emergency piston chamber 23, shifting the piston 27 to release position in which a passage 44 is uncovered. The passage 44 leads to valve chamber 30 and contains a ball check valve 45 arranged to prevent back flow from the valve chamber 30 to the brake pipe. The quick action chamber 31 is then charged from valve chamber 30 through passage 32.

Quick action closing chamber 46 is also charged from valve chamber 30 through port 47 in valve 28 and passage 48.

If it is desired to effect a service application of the brakes, a gradual reduction in brake pipe pressure is made and the equalizing piston 5 thereby shifted to application position, as shown in Fig. 2 of the drawings, closing feed groove 37 and supplemental reservoir passage 40. In this position, port 49 in the main slide valve 14 is uncovered by the movement of the auxiliary valve 15 and registers with passage 50.

Fluid from the auxiliary reservoir then flows through said passage and passages 51 and 52 to the exposed outer face of the release piston 16, thereby shifting the release valve 20 to its seat so that the exhaust from the brake cylinder is closed. A further movement of the release piston 16 relative to the piston head 18 then takes place so as to open a passage 53, through which fluid can flow to the brake cylinder 54 past check valve 55 and through passages 56, 57, 58, 59 and pipe 60.

The space intermediate the piston heads 16 and 18 is open to passage 56 which communicates through passages 57 and 58 with brake cylinder passage 59, and when the opposing fluid pressures on the piston head 16 have substantially equalized, the spring 22 returns the same so as to close the passage 53, the release valve 20 remaining seated.

The passage 53 is thus cut off from release piston chamber 17, so that even if the check valve 55 should leak, it will only be necessary to vent fluid from said chamber to effect the opening of the release valve.

Further reductions in brake pipe pressure may be made in the usual manner for effecting an increase in brake cylinder pressure and the release piston 16 will be operated by the further flow of fluid from the auxiliary reservoir to open the passage 53, as will be evident.

When a service reduction in brake pipe pressure is made, the reduced brake pipe pressure on the emergency piston 27 is sufficient to shift the same, together with the auxiliary valve 29, until the piston engages the spring stop 61. The check valve 45 prevents back flow from the valve chamber 30 to the brake pipe, but the movement of the auxiliary valve 29 causes port 62 therein to register with port 63 in the emergency slide valve 28, so that fluid is vented from valve chamber 30 and the quick action chamber 31 to exhaust port 64.

The pressure in the quick action chamber is thus reduced with the brake pipe pressure and when the pressures become substantially equalized the piston 27 is shifted back so as to cause the auxiliary valve 29 to lap the port 63.

It will now be seen that in making service applications of the brakes, while fluid in the quick action chamber is prevented from flowing back to the brake pipe, thus obviating delay in applying the brakes nevertheless, the quick action chamber pressure is reduced with brake pipe pressure by venting to the atmosphere, so that there will be no danger of the emergency valve mechanism shifting to emergency position.

In releasing the brakes, the movement of the equalizing piston 5 and the valves 14 and 15 to release position operates to connect passage 52 through the communicating passages with port 65 in the main slide valve which in turn is connected through cavity 66 and port 67 with exhaust port 68. Fluid is thus vented from the chamber at the outer face of the release piston 16, so that brake cylinder pressure, acting on the opposite face, operates to shift the piston to its seat. The release valve 20 is then opened and fluid from the brake cylinder is released through passage 56 and port 69.

In order to effect an emergency application of the brakes, a sudden reduction in brake pipe pressure is made, and thereby the equalizing valve device and the release valve mechanism are shifted to application position, the action being the same as hereinbefore described in connection with a service application of the brakes.

It will be noted that the emergency piston 27 and the graduating valve 29 have a movement relative to the main valve 28 beyond the service position, shown in Fig. 2 of the drawings, so that the port for supplying fluid from the quick action chamber 31 to the quick action piston 33 is uncovered by the further movement of the graduating valve 29 without moving the main valve 28, this movement at the same time closing the relief port 63.

The movement of the emergency valve parts beyond service position, however, can only be effected by a sudden reduction in brake pipe pressure, since it is necessary to overcome the resistance of the spring stop 61 which engages the piston 27 in service position.

When the graduating valve 29 uncovers the port for supplying fluid to the passage 70, fluid is admitted to quick action piston chamber 34 and the piston 33 thereupon actuates the vent valve 35 to open communication for venting fluid from the brake pipe, to produce a local reduction in brake pipe pressure.

Further movement of the emergency parts to emergency position, as shown in Fig. 3 of the drawings, causes the cavity 71 to connect the passage 48 with passage 70, so that the normally charged quick action closing chamber 46 is connected to the quick action piston chamber 34.

When the pressure in the quick action chamber 34 has been reduced to substantially atmospheric pressure, by flow through the restricted port 72 in piston 33 to the atmosphere, then the piston 33 and the vent valve 35 will be returned to closed position by the spring 74, thus effecting a predetermined reduction in brake pipe pressure, dependent upon the capacity of the quick action closing chamber 46 and the rate at which fluid can escape through the restricted port 72.

By employing a small graduating valve having little resistance to movement for initiating quick action, the prompt starting of quick action is insured, while at the same time effective means are provided for preventing emergency action except when a sudden reduction in brake pipe pressure is made.

In order to effect a quick and prompt flow of fluid from the auxiliary reservoir to the brake cylinder a valve piston 75 is provided which has one side connected to the brake pipe through passage 76 and is normally held seated, closing a brake cylinder passage 77, by a spring 78. The limited area of the valve piston outside of the seat is exposed to auxiliary reservoir pressure admitted thereto through passage 79 which connects with a pipe 80 leading to auxiliary reservoir pipe 13.

The valve piston remains on its seat under gradual reductions in brake pipe pressure, but upon a predetermined emergency rate of reduction in brake pipe pressure, the auxiliary reservoir pressure overcomes the brake pipe pressure and the valve piston moves to open a large passage for the direct flow of fluid from the auxiliary reservoir to the brake cylinder. In order to insure the prompt return of the emergency piston 27 to release position after an emergency application of the brakes has been made, a passage 81 having a restricted outlet to the atmosphere and opening into the valve chamber 30 may be provided.

The passage 81 is controlled by the slide valve 28 and when said valve is in emergency position, the passage is opened, so that fluid in the valve chamber 30 and the quick action chamber 31 slowly escapes to the atmosphere.

When the pressure in the quick action chamber has been reduced to a degree corresponding with the reduced brake pipe pressure, the spring stop 61 operates to shift the emergency valve mechanism to release position.

Having now described my invention, what I claim as new and desire to secure by Letters Patent, is:

1. In a fluid pressure brake, the combination with a brake pipe and an equalizing valve device operated upon a gradual reduction in brake pipe pressure for effecting a service application of the brakes, of an emergency valve mechanism comprising a piston subject to the opposing pressures of the brake pipe and a chamber, a main valve, and a graduating valve, said graduating valve being operated by said piston without moving the main valve upon a gradual reduction in brake pipe pressure for venting fluid from said chamber.

2. In a fluid pressure brake, the combination with a brake pipe, and an equalizing valve device operated upon a gradual reduction in brake pipe pressure for effecting a service application of the brakes, of an emergency valve mechanism comprising a piston subject to the opposing pressures of the brake pipe and a chamber, a main valve, and a graduating valve, said graduating valve being movable by said piston relatively to said main valve upon a gradual reduction in brake pipe pressure to a position for venting fluid from the chamber.

3. In a fluid pressure brake, the combination with a brake pipe, and an equalizing valve device operated upon a gradual reduction in brake pipe pressure for effecting a service application of the brakes of an emergency valve mechanism comprising a valve and a piston subject to the opposing pressures of the brake pipe and a chamber for operating said valve upon a sudden reduction in brake pipe pressure, and a feed passage through which the chamber is charged from the brake pipe and containing a check valve for preventing back flow, said valve mechanism being operated upon a gradual reduction in brake pipe pressure for venting fluid from said chamber.

4. In a fluid pressure brake, the combination with a brake pipe and an equalizing valve device operated upon a gradual reduction in brake pipe pressure for effecting a service application of the brakes, of an emergency valve mechanism subject to the opposing pressures of the brake pipe and a chamber, and a feed passage for charging the chamber from the brake pipe and containing a check valve for preventing back flow from the chamber to the brake pipe, said valve mechanism being operative upon a gradual reduction in brake pipe pressure for venting fluid from said chamber.

5. In a fluid pressure brake, the combination with a brake pipe, of an emergency valve mechanism comprising a piston subject to the opposing pressures of the brake pipe and a chamber, a main valve, and a graduating valve movable with the piston relatively to said main valve upon a gradual reduction in brake pipe pressure to a position for venting fluid from said chamber, and a yielding stop device for defining said position of the emergency valve mechanism.

6. In a fluid pressure brake, the combination with a brake pipe, of an emergency mechanism comprising a main valve, a piston subject to the opposing pressures of the brake pipe and a chamber and an auxiliary valve operated by said piston upon a gradual reduction in brake pipe pressure for venting fluid from said chamber to the atmosphere.

7. In a fluid pressure brake, the combination with a brake pipe, of an emergency valve mechanism comprising a main valve, a piston subject to the opposing pressures of the brake pipe and a chamber and operated upon a sudden reduction in brake pipe pressure for actuating said valve, and an auxiliary valve movable relatively to the main valve and operated by said piston upon a gradual reduction in brake pipe pressure for venting fluid from said chamber to the atmosphere.

8. In a fluid pressure brake, the combination with a brake pipe, of an emergency valve mechanism comprising a main valve, a piston subject to the opposing pressures of the brake pipe and a chamber and operated upon a sudden reduction in brake pipe pressure for actuating said valve, and an auxiliary valve movable relatively to the main valve by said piston upon a gradual reduction in brake pipe pressure for opening a vent port from said chamber and having a further relative movement for closing said vent port.

9. In a fluid pressure brake, the combination with a brake pipe, of an emergency valve mechanism comprising a main valve, a piston subject to the opposing pressures of the brake pipe and a chamber and operated upon a sudden reduction in brake pipe pressure for actuating said valve, and an auxiliary valve mounted on and having a movement relative to the main valve and operated by said piston for first opening and then closing a vent port from said chamber before the main valve is moved.

10. In a fluid pressure brake, the combination with a brake pipe, of a quick action chamber, and an emergency valve mechanism comprising a main valve, a piston subject to the opposing pressures of the brake pipe and the quick action chamber, and an auxiliary valve movable relatively to the main valve by said piston upon a gradual reduction in brake pipe pressure for opening a vent port from the quick action chamber and having a further relative movement upon a sudden reduction in brake pipe pressure for closing said vent port and for initiating quick action.

11. In a fluid pressure brake, the combination with a brake pipe, of a quick action valve mechanism, a quick action chamber, and an emergency valve mechanism comprising a main valve, a piston subject to the opposing pressures of the brake pipe and said quick action chamber, and an auxiliary valve movable relatively to the main valve by said piston upon a gradual reduction in brake pipe pressure for venting fluid from the quick action chamber and having a further relative movement upon a sudden reduction in brake pipe pressure for venting fluid from the quick action chamber to the quick action valve mechanism to actuate same.

12. In a fluid pressure brake, the combination with a brake pipe, of a quick action valve mechanism, a quick action chamber, a quick action closing chamber, and an emergency valve mechanism comprising a main valve, a piston subject to the opposing pressures of the brake pipe and said quick action chamber, and an auxiliary valve movable relatively to the main valve by said piston upon a gradual reduction in brake pipe pressure for venting fluid from the quick action chamber and having a further relative movement upon a sudden reduction in brake pipe pressure for venting fluid from the quick action chamber to the quick action valve mechanism to actuate same, the main valve being movable by said piston upon a sudden reduction in brake pipe pressure for connecting said quick action valve mechanism to the quick action closing chamber.

In testimony whereof I have hereunto set my hand.

WALTER V. TURNER.

Witnesses:
  A. M. CLEMENTS,
  S. W. KEEFER.